Aug. 12, 1947.   A. R. CARNES   2,425,419
BLAST DUSTER
Filed June 4, 1942   3 Sheets-Sheet 3
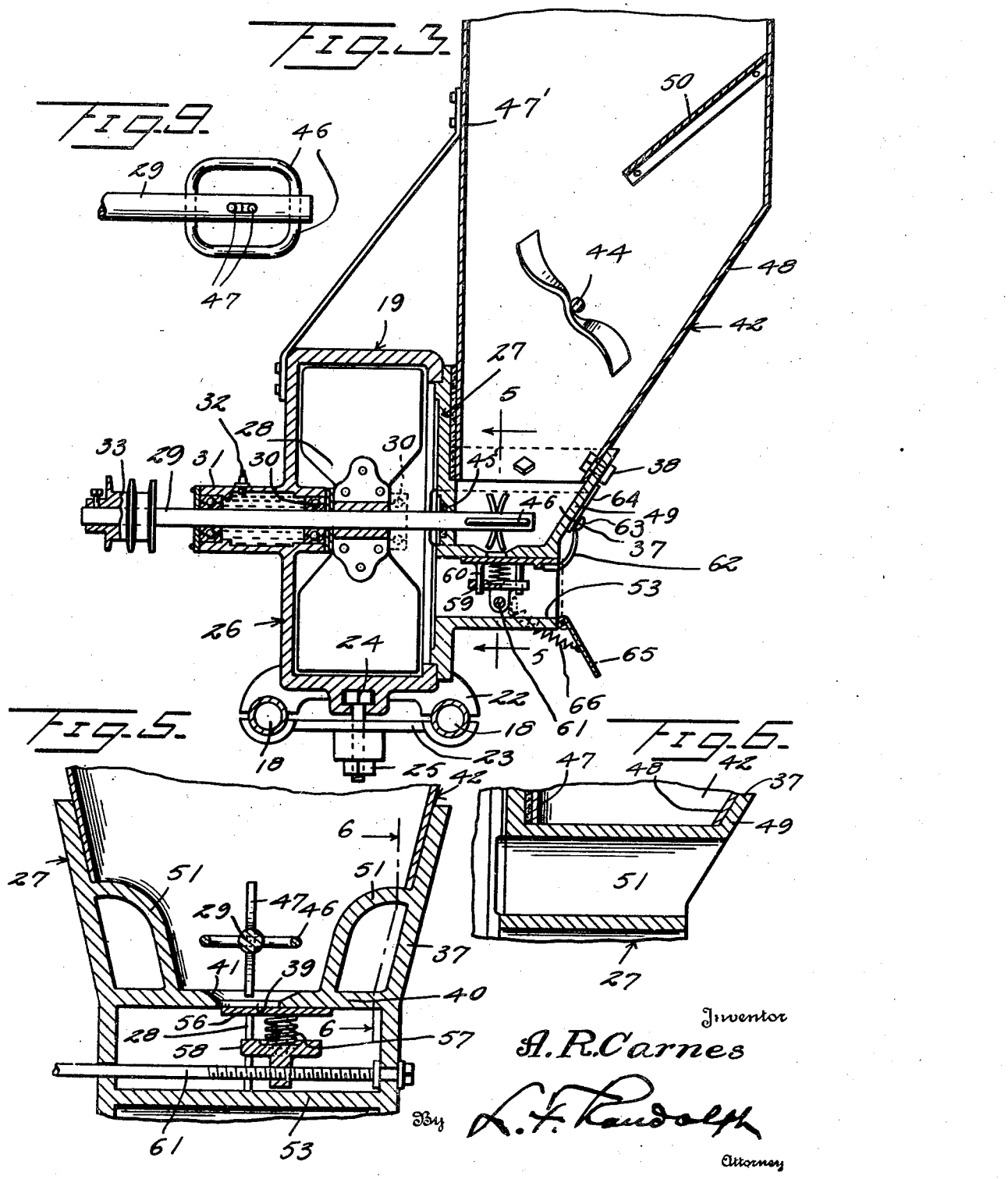

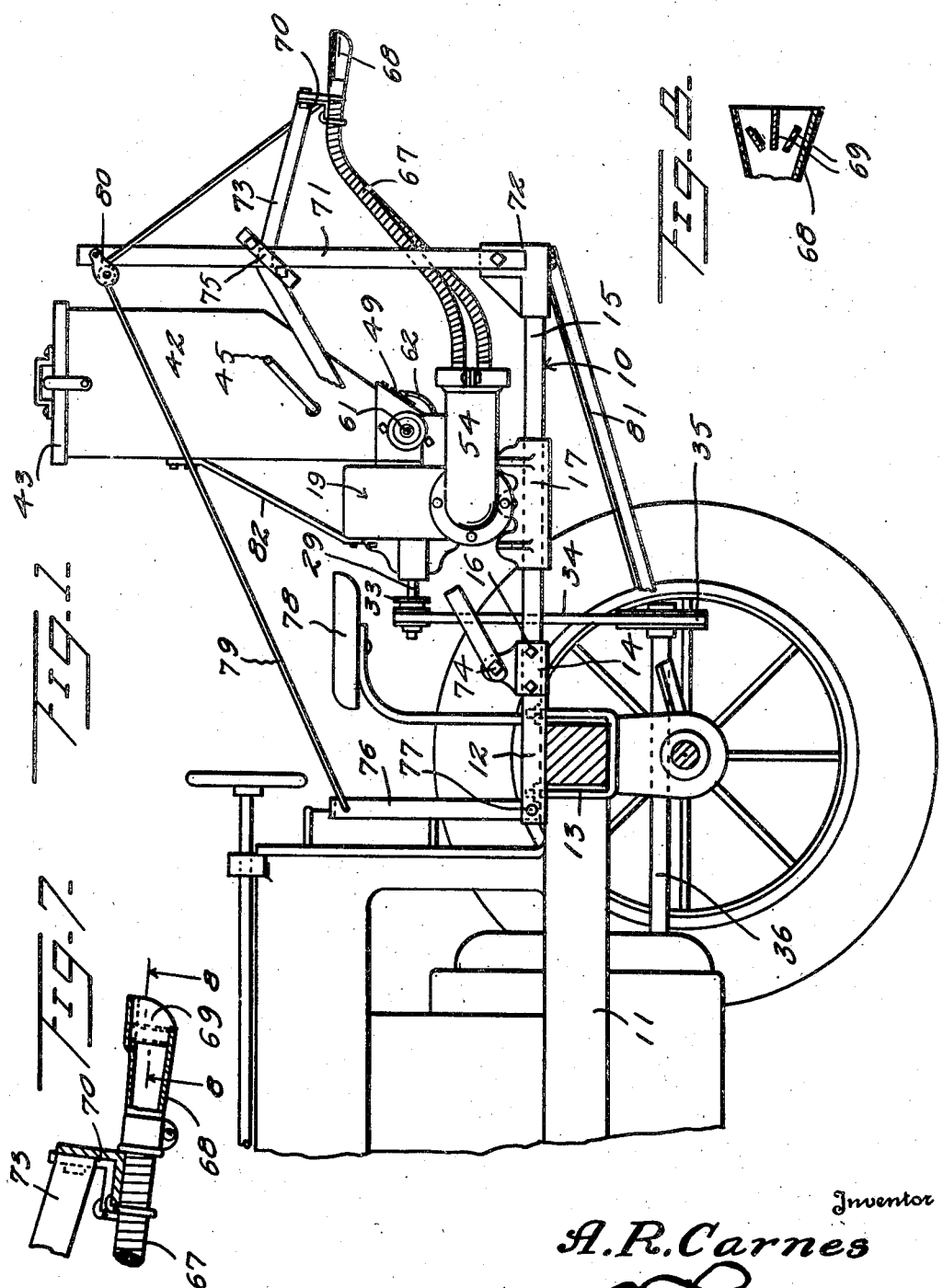

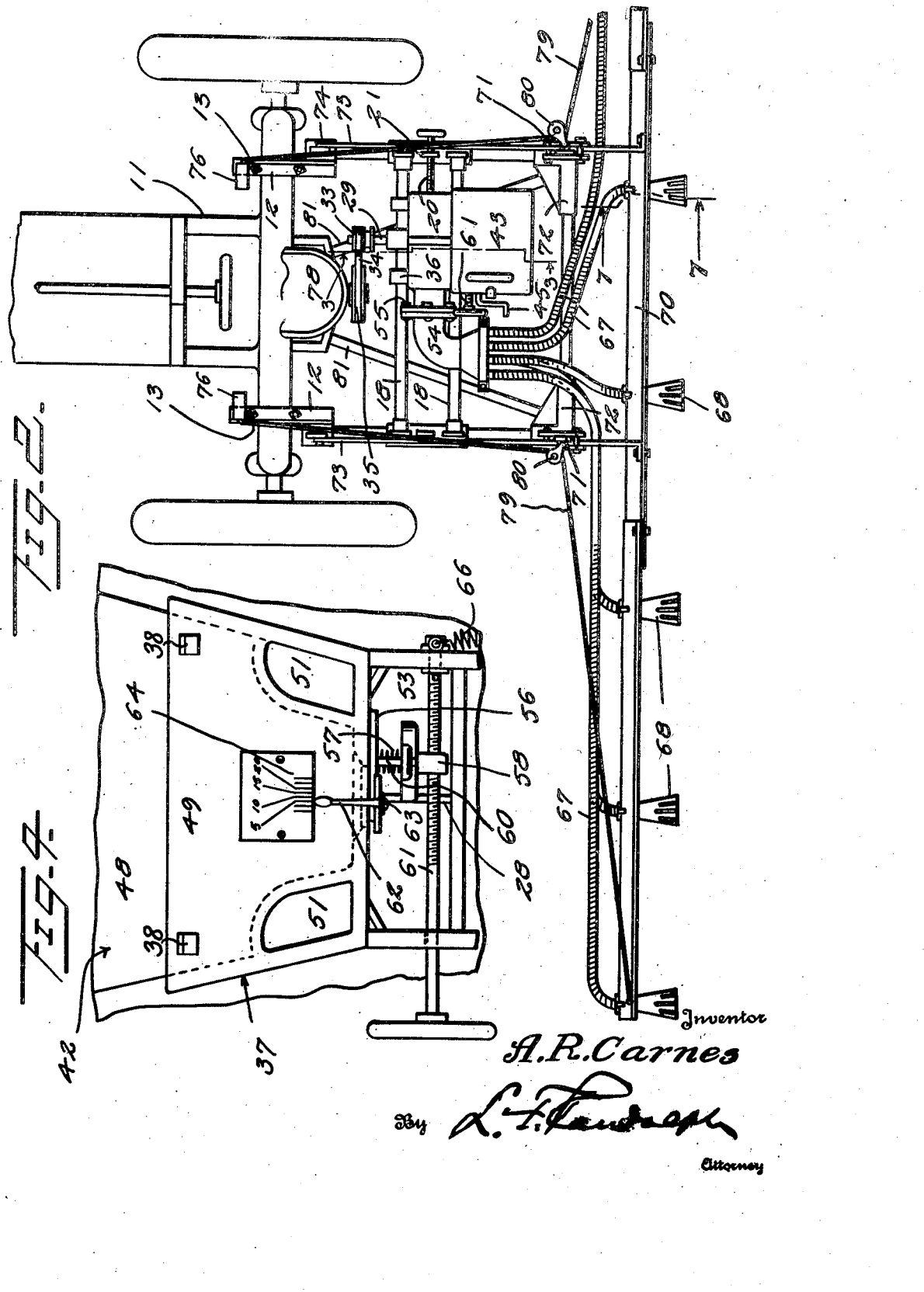

Patented Aug. 12, 1947

2,425,419

UNITED STATES PATENT OFFICE 2,425,419

BLAST DUSTER

Albert Roscoe Carnes, Chilton, Tex.

Application June 4, 1942, Serial No. 445,769

2 Claims. (Cl. 222—193)

This invention relates to a duster or means for distributing poison dust or any equivalent onto vegetation, particularly cotton plants, to destroy injurious insects or animal life.

It is especially aimed to provide a novel and more efficient means for supplying the dust in coaction with a blower or blast means, particularly in a manner which will avoid packing of the dust, especially utilizing the shaft of the blower to actuate an agitator which extends into the discharge opening and with which opening an agitator, the wall construction of the hopper coacts.

In addition, it is aimed to provide a novel mounting or frame enabling the structure to form an attachment to a tractor or the like.

Another object is to provide such an apparatus as utilizes a closure or end for the blower as the discharge from the hopper and inlet for air to the blower.

The more specific objects and advantages will be evident from a consideration of the description following taken in connection with the accompanying drawings, illustrating an operative example.

In said drawings:

Figure 1 is a side view of the rear end of a tractor showing my invention mounted thereon;

Figure 2 is a plan view of the parts of Figure 1, partly broken away;

Figure 3 is an enlarged partial longitudinal vertical sectional view particularly through the blower and hopper and associated parts taken approximately on line 3—3 of Figure 2;

Figure 4 is a fragmentary rear elevation looking toward the discharge end of the hopper;

Figure 5 is a vertical section taken on the line 5—5 of Figure 3;

Figure 6 is a vertical section taken on the line 6—6 of Figure 5;

Figure 7 is a detail taken on the line 7—7 of Figure 2;

Figure 8 is a detail section taken on the line 8—8 of Figure 7, and

Figure 9 is a fragmentary end elevation of the blower shaft and agitator thereon for the dust.

Referring specifically to the drawings wherein like reference characters designate like or similar parts, I employ a mounting and attaching frame generally of U-shape at 10 which is horizontally disposed. Such frame and improvements are carried by a mobile body such as a tractor, suggested at 11. The tractor has angle bars 12 detachably secured thereto by U-bolts 13 and at the rear ends thereof brackets 14 are provided to which the forward ends of side bars or arms 15 of the frame 10 are screwed or bolted as at 16.

Brackets or sleeves 17 are mounted on each side bar 15 and spanning the same are spaced parallel transverse arms or bars 18. Adjustably positioned on the bars 18 is a blower unit generally designated 19, accuracy in adjustment being effected through operation of a screw 20 having swivel connections with the blower unit and threaded in a lug 21 on one of the sleeves 17. The blower unit is clamped to the bars 18 by fixed clamping lugs 22 on the unit and by one or more clamping bars 23 engaging the under surfaces of the bars 18 and suspended from the unit by a bolt 24, equipped with a nut 25 operable to clamp the bar 23 in place.

Blower unit 19 consists of a main casing section 26 generally of cup shape and an end or auxiliary casing section 27 bolted or otherwise detachably secured thereto. Operable within the blower casing is a suitable fan 28 which is rigid on an operating shaft 29 journaled in suitable anti-friction bearings at 30 which are dust proof and well capable of efficient lubrication. It will be noticed that the outermost bearings 30 are positioned in a reservoir 31 through which lubricant may be supplied by means of a fitting at 32.

Shaft 29 is adapted to be driven preferably from the source of power of the tractor 11. To this end, a pulley 33 is rigid on shaft 29 and traversed by a belt 34 also traversing a pulley 35 mounted on a power take-off shaft 36 driven by the prime mover of tractor 11.

Integral with casing section 27 is a hopper-like receptacle portion 37 having an outlet opening 39 in its base or bottom wall 40 and which wall 40 around the opening 39 is beveled or chamfered as at 41. The hopper 42 is open at its bottom, extends into the hopper portion 37 and is bolted in place thereto as at 38. This hopper may have a suitable closure 43 and a mixer 44. Such mixer may be operated by a crank 45 on the exterior of the hopper.

It will be noted that the blower shaft 29 extends into the hopper portion 37. The section 27 constitutes a bearing for such shafts 29 and about the same mounts dust proof packing or any equivalent as at 45'. A distal end of such shaft 29 is used as an agitator within the hopper portion 37 and accordingly includes for example, a pair of loops 46 and blades 47. It is clear that any other suitable agitating means may be substituted.

The material with which the machine is usually used is a poisonous dust. Serious difficulties have been experienced in efficiently distributing the dust due to packing thereof before reaching the discharge point. The present invention particularly aims to provide a construction which avoids such packing. To this end it will be noted that the wall 47' is vertical and that this is true of that portion of section 27 of the casing which is a continuation of wall 47' below it. The side walls preferably converge downwardly while the rear wall inclines abruptly downwardly and inwardly as at 48 with the wall 49 of hopper section 37 correspondingly inclining. Said rear wall above portion 48 is vertical, and extending inwardly therefrom toward the wall 47' is a downwardly and inwardly inclined baffle 50 arranged above the mixer 44. It will be especially noted that the agitating elements 46 and 47 move within the opening 39, thus below the upper surface of the wall 40.

Said hopper portion 37 has walls or webs at 51 which communicate with the interior of the blower and with the atmosphere so that air may be drawn into the blower.

Said casing section 27 below the opening 39 has a discharge conduit 53 integral therewith. Opening 39 delivers the dust from the hopper 42 into the conduit 53 and since the latter communicates with the interior of the blower and with the atmosphere, the dust receives a blast of air which discharges or distributes it, drawing the dust into the blower casing and then discharging it through an elbow or manifold 54 coupled at 55 to the outlet from the blower unit.

The discharge of the dust from the hopper into conduit 53 through opening 39 is under control of a regulating valve plate 56. Such valve plate 56 is slidable and held against the wall 40 by an expansive coil spring 57 which also engages a bracket 58 having recesses 59 slidably receiving depending pins 60 on the valve plate 56. The bracket 58 is in screw threaded engagement with a manually operable rotatable rod 61 journaled in suitable walls of the casing section 27. To aid in adjusting the valve plate 56 to set the same to discharge a predetermined quantity of the dust per acre, an indicator arm 62 is adjustably fastened to the valve plate by a screw 63 and such arm coacts with a dial or calibrated plate as shown at 64. A closure 65 may be provided for the atmospheric end of the conduit 53 and associated therewith and fastened to the same and to the conduit is a contractile coil spring 66 which holds the closure in either open or closed position.

From the discharge pipe or manifold 54, a number of flexible conduits 67 extend which are terminally equipped with suitable nozzles at 68, preferably having divider ribs 69 therein to increase the diffusion of the dust. At their outer ends, the flexible conduits or tubes 67 are connected to and supported by an angle bar 70, which may be conveniently made sectional as shown. Uprights 71 are connected to unions 72 secured to the rear corners of the frame 10. Long arms or bars 73 are pivoted at 74 to brackets 14. The bars 73 may be arranged to hold the nozzles 68 in any predetermined position according to the height of the cotton or other plants being dusted and to this end, clamps 75 may be used to bind the bars 73 against the upright bars 71. It will be noted that levers 76 are pivoted at 77 to the angle members 12 and are arranged adjacent to the driver's seat 78 of the tractor so as to be under control of such driver. From the levers 76 cables or other flexible elements 79 pass, being guided by pulleys 80 fastened to the uprights 71 and at their other ends being fastened to the bar 70. Operation of the levers 76, when the clamps 75 are loose, draws or pays out the cables 79 in order to vary the vertical position of the nozzles 68, thus varying the adjustment of the latter, following which the clamps 75 are tightened.

Braces 81 for the frame 10 may extend from the couplings 72 to suitable parts of the tractor 11 and a brace 82 may also join the blower housing section 26 and the hopper 42.

Various changes may be resorted to provided they fall within the spirit and scope of the invention.

I claim as my invention:

1. A device of the class described comprising a blower, said blower having a casing provided with a hopper portion extending outwardly from one side wall, said hopper portion having a discharge opening in its bottom, said blower having a shaft journaled to said wall and extending into the hopper portion, agitating means on said shaft and disposed in said hopper portion, a conduit integral with the blower casing disposed below said hopper portion bottom and into which said opening leads, said conduit at one end communicating with the atmosphere and at the other end communicating with the interior of the blower casing, and valve means in the conduit for said opening.

2. A device of the class described comprising a blower, said blower having a casing provided with a hopper portion extending outwardly from one side wall, said hopper portion having a discharge opening in its bottom, said blower having a shaft journaled to said wall and extending into the hopper portion, agitating means on said shaft and displaced in said hopper portion, a conduit integral with the blower casing disposed below said hopper portion bottom and into which said opening leads, said conduit at one end communicating with the atmosphere and at the other end communicating with the interior of the blower casing, valve means in the conduit for said opening, comprising a plate, a follower bracket, means forming a slidable connection between the follower bracket and plate, spring means between the follower bracket and plate urging the plate into operative position, and feed screw means to operate the follower bracket.

ALBERT ROSCOE CARNES.

REFERENCES CITED

The following references are of record in the file of this patent:

UNITED STATES PATENTS

| Number | Name | Date |
|---|---|---|
| 1,482,495 | Westhaver | Feb. 5, 1924 |
| 1,122,847 | Blain | Dec. 29, 1914 |
| 2,212,032 | Moon | Aug. 20, 1940 |
| 1,229,994 | McWhorter | June 12, 1917 |
| 1,832,963 | Burger | Nov. 24, 1931 |
| 1,858,090 | Hull | May 10, 1932 |
| 831,669 | Leggett | Sept. 25, 1906 |
| 1,840,805 | Benner | Jan. 12, 1932 |
| 933,039 | Knapp | Aug. 31, 1909 |
| 1,543,916 | Green | June 30, 1925 |
| 899,956 | Coons | Sept. 29, 1908 |
| 1,194,915 | Woolery | Aug. 15, 1916 |
| 1,645,932 | Salyards | Oct. 18, 1927 |
| 1,687,435 | Fleetwood | Oct. 9, 1928 |
| 2,291,871 | Bokum | Aug. 4, 1942 |
| 2,324,042 | Swenson | July 13, 1943 |
| 1,724,805 | Root | Aug. 13, 1929 |

FOREIGN PATENTS

| Number | Country | Date |
|---|---|---|
| 441,709 | France | Aug. 14, 1912 |
| 18,605 | Great Britain | 1911 |
| 23,021 | Great Britain | 1895 |
| 42,526 | Denmark | July 24, 1930 |